United States Patent
Vogler et al.

(10) Patent No.: US 6,690,703 B1
(45) Date of Patent: *Feb. 10, 2004

(54) MOLECULAR FLUORINE LASER SYSTEM

(75) Inventors: Klaus Wolfgang Vogler, Goettingen (DE); Sergei V. Govorkov, Boca Raton, FL (US); Gongxue Hua, Coral Springs, FL (US); Frank Voss, Bad Gandersheim (DE); Elko Bergmann, Goettingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/211,971

(22) Filed: Aug. 2, 2002

Related U.S. Application Data

(60) Provisional application No. 60/309,939, filed on Aug. 2, 2001.

(51) Int. Cl.$^7$ .......................... H01S 3/225; H01S 3/223
(52) U.S. Cl. ............................................ 372/57; 372/55
(58) Field of Search ................................. 372/57, 55

(56) References Cited

U.S. PATENT DOCUMENTS

| | | | |
|---|---|---|---|
| 4,393,405 A | 7/1983 | Ikeda .......................... | 358/153 |
| 4,399,540 A | 8/1983 | Bucher ........................ | 372/20 |
| 4,611,270 A | 9/1986 | Klauminzer et al. ........ | 364/183 |
| 6,005,880 A | 12/1999 | Basting et al. ................ | 372/38 |
| 6,226,307 B1 | 5/2001 | Desor et al. .................. | 372/37 |
| 6,381,256 B1 * | 4/2002 | Stamm et al. ................ | 372/57 |
| 6,426,966 B1 | 7/2002 | Basting et al. ................ | 372/19 |
| 6,442,182 B1 | 8/2002 | Govorkov et al. ..... | 372/29.021 |
| 6,490,306 B2 * | 12/2002 | Stamm et al. ................ | 372/57 |
| 2002/0021729 A1 * | 2/2002 | Vogler ......................... | 372/55 |
| 2002/0075933 A1 * | 6/2002 | Stamm et al. ................ | 372/57 |

FOREIGN PATENT DOCUMENTS

| EP | 0 472 727 A1 | 5/1990 | ......... H01S/3/1055 |
|---|---|---|---|

OTHER PUBLICATIONS

U.S. Provisional patent application No. 60/204,095, filed May 15, 2000, by Rustem Osmanow et al., 32 pages in length.

U.S. Provisional; patent application No. 60/228,184, filed Aug. 25, 2000, by Klaus Wolfgang Vogler, 27 pages in length.

K. Vogler et al., "Advanced $F_2$–Lasers for Microlithography," *Proceedings of SPIE (in Optical Microlithography XIII)*, vol. 4000, published 2000, pp. 1515–1528.

* cited by examiner

*Primary Examiner*—Paul Ip
*Assistant Examiner*—James Menefee
(74) *Attorney, Agent, or Firm*—Stallman & Pollock LLP

(57) ABSTRACT

A molecular fluorine laser includes a discharge chamber filled with a gas mixture including molecular fluorine and a buffer gas and not including a laser active rare gas, multiple electrodes within the discharge chamber defining a discharge region therebetween connected to a pulsed discharge circuit for applying discharge pulses to the electrodes for energizing the gas mixture, and a resonator including the discharge chamber for generating an oscillator laser beam at a wavelength around 157 nm and a bandwidth of less than 0.6 pm. The laser further includes a power amplifier for increasing the energy of the attenuated oscillator laser beam to a second predetermined energy for lithographic processing, a line-narrowing unit for reducing the bandwidth, a low intensity suppressor module to suppress the weaker lines of the $F_2$-laser, and a synchronization unit to synchronize the oscillator and amplifier.

3 Claims, 2 Drawing Sheets

MOLECULAR FLUORINE LASER SYSTEM

PRIORITY

This application claims the benefit of priority to U.S. provisional patent application No. 60/309,939, filed Aug. 2, 2001.

BACKGROUND

The invention relates to molecular fluorine lasers emitting around 157 nm. The emitting molecular fluorine laser oscillator followed by an amplifier for increasing the energy of the emitted laser beam to a desired power for applications processing.

DESCRIPTION OF THE RELATED ART

The oscillator-amplifier design provides a laser beam at desired energies for application processing such as photolithography. Use of the design set forth also involves synchronization of two laser systems, i.e., the oscillator and the amplifier, in parallel, which can be expensive, can tend to occupy a lot of space and may be unreliable under certain circumstances. Preliminary experiments have shown that the oscillator-amplifier stage can provide an advantageous 157 nm laser beam for application processing. However, the design may also present, in some circumstances, a competitively disadvantageous economic solution relative to systems which would use the natural bandwidth of emission of the $F_2$ laser for use with an imaging system having a catadioptric lens design. It is therefore an object of the present invention to provide a more compact, economic molecular fluorine laser system which emits a beam around 157 nm having a narrow bandwidth and sufficient power for application processing.

SUMMARY OF THE INVENTION

In view of the above object, a molecular fluorine ($F_2$) laser system is provided including a power amplifier. The oscillator includes a laser tube including multiple electrodes therein which are connected to a discharge circuit. The laser tube is part of an optical resonator for generating a laser beam including a first line of multiple characteristic emission lines around 157 nm. The laser tube is filled with a gas mixture including molecular fluorine and a buffer gas. The gas mixture is at a pressure that can be below that which results in the generation of a laser emission including the first line around 157 nm having a natural linewidth of less than 0.5 pm without an additional line-narrowing optical component for narrowing the first line. The power amplifier increases the power of the beam emitted by the oscillator to a desired power for applications processing.

A molecular fluorine laser system is also provided including a discharge tube filled with a gas mixture including molecular fluorine and a buffer gas, multiple electrodes within the discharge chamber connected to a discharge circuit for energizing the gas mixture, a resonator for generating a laser beam including a first line of multiple characteristic emission lines around 157 nm, and a power amplifier for increasing the power of the beam generated by the resonator to a desired power for applications processing. The gas mixture has a total pressure which is sufficiently low such that the laser beam includes the first line around 157 nm having a linewidth of less than 0.5.

A molecular fluorine laser system is further provided including a discharge tube filled with a gas mixture including molecular fluorine and a buffer gas, multiple electrodes within the discharge chamber connected to a discharge circuit for energizing the gas mixture, a resonator for generating a laser beam including a first line of multiple characteristic emission lines around 157 nm, and a power amplifier for increasing the power of the beam generated by the resonator to a desired power for applications processing. The resonator includes at least one line-narrowing optical component for narrowing a linewidth of the first line around 157 nm. The gas mixture has a total pressure which is sufficiently low such that the line-narrowed first line has a linewidth of less than 0.2 pm.

A molecular fluorine laser system is also provided including a discharge tube filled with a gas mixture including molecular fluorine and a buffer gas, multiple electrodes within the discharge chamber connected to a discharge circuit for energizing the gas mixture, a resonator for generating a laser beam including a first line of multiple characteristic emission lines around 157 nm, a gas handling unit coupled with the discharge tube for flowing gas between the discharge tube and the gas handling unit, a processor for controlling the flow of gases between the gas handling unit and the discharge tube to control one or more parameters associated with the gas mixture, and a power amplifier for increasing the power of the beam generated by the resonator to a desired power for applications processing. The gas mixture has a total pressure which is sufficiently low such that the laser beam includes the first line around 157 nm having a linewidth of less than 0.5 pm.

A molecular fluorine laser system is also provided including a discharge tube filled with a gas mixture including molecular fluorine and a buffer gas, multiple electrodes within the discharge chamber connected to a discharge circuit for energizing the gas mixture, a resonator for generating a laser beam including a first line of multiple characteristic emission lines around 157 nm, a gas handling unit coupled with the discharge tube for flowing gas between the discharge tube and the gas handling unit, and a processor for controlling the flow of gases between the gas handling unit and the discharge tube to control one or more parameters associated with the gas mixture. The gas mixture has a total pressure which is sufficiently low such that the laser beam includes the first line around 157 nm having a linewidth of less than 0.5 pm.

A method for controlling a bandwidth of an excimer or molecular fluorine laser system is also provided, including the steps of operating the laser system, monitoring the bandwidth of an output beam of the laser system, controlling a gas mixture pressure within a laser tube of the laser system at a predetermined pressure that is sufficiently low such that the output beam includes a first line of multiple characteristic emission lines around 157 nm having a linewidth of less than 0.5 pm, and amplifying the output beam for increasing the power of the beam generated by the resonator to a desired power for applications processing.

A method for controlling a bandwidth of an excimer or molecular fluorine laser system is further provided including operating the laser system, monitoring the bandwidth of an output beam of the laser system, and controlling a gas mixture pressure within a laser tube of the laser system at a predetermined pressure that is sufficiently low such that the output beam includes a first line of multiple characteristic emission lines around 157 nm having a linewidth of less than 0.5 pm.

A method for controlling a bandwidth of an excimer or molecular fluorine laser system is also provided including operating the laser system, and controlling a gas mixture pressure within a laser tube of the laser system at a predetermined pressure that is sufficiently low such that the output beam includes a first line of multiple characteristic emission lines around 157 nm having a linewidth of less than 0.5 pm.

DESCRIPTION OF THE INVENTION

Figure 1:
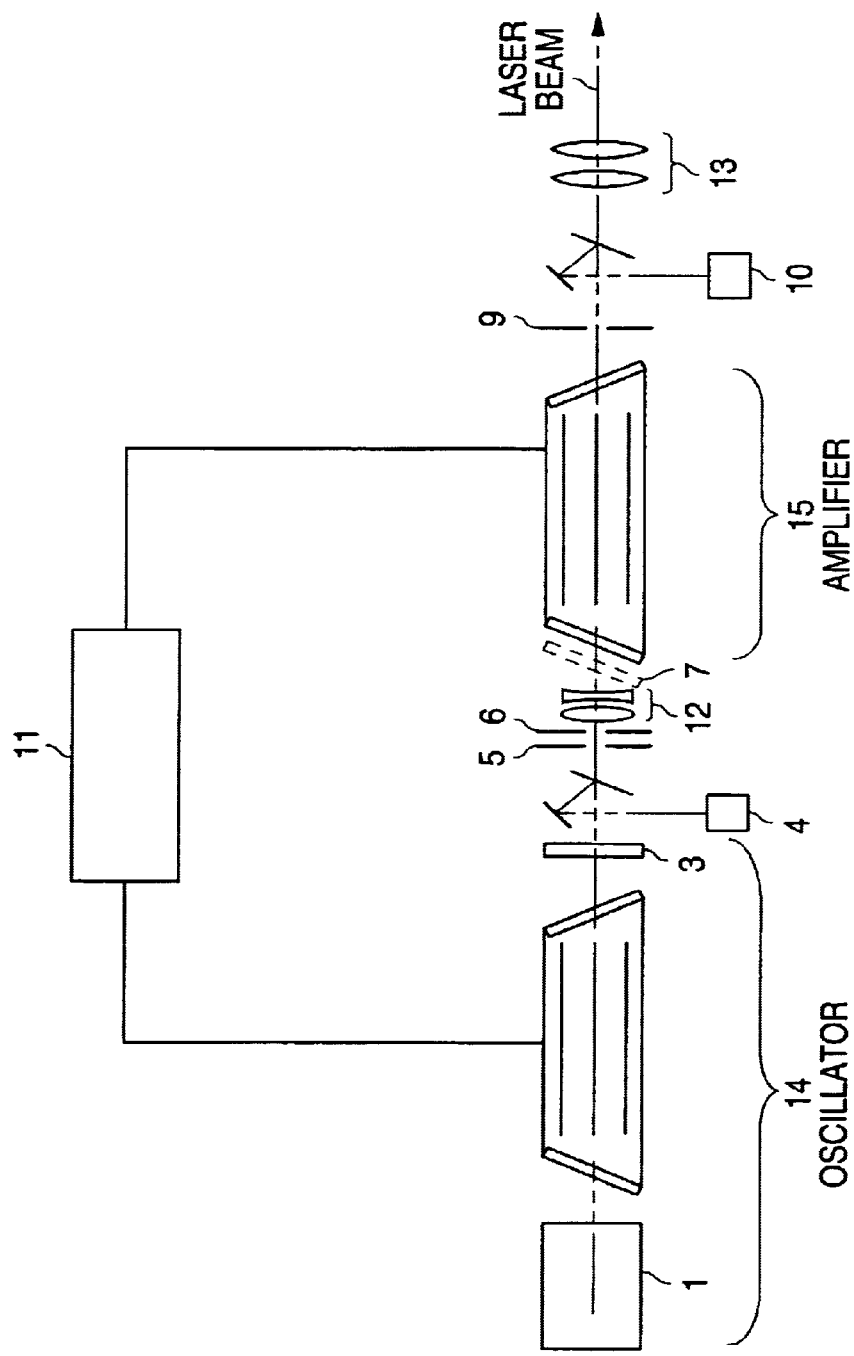
FIG. 1 schematically illustrates a molecular fluorine laser emitting a 157 nm beam and an power amplifier

In FIG. 1 a preferred setup is shown. A molecular fluorine ($F_2$)-laser oscillator (14) and power amplifier (15) are provided, wherein the master oscillator is a narrow linewidth 157 nm oscillator (see also U.S. patent applications Ser. Nos. 09/599,130 and 60/228,184, which are assigned to the same assignee as the present application and are hereby incorporated by reference). It is necessary to narrow the linewidth which is done by unit (1). Further this unit (1) may contain a suppression unit, because only the strongest line of the $F_2$-laser is of importance. The linewidth can be also varied by the He partial pressure and $F_2$ concentration in the oscillator (14). A lower partial He pressure will effect a smaller linewidth (see also U.S. patent application Ser. No. 09/883,128 which are assigned to the same assignee as the present application and are hereby incorporated by reference).

The laser oscillator is followed by an output coupler (3) and an oscillator energy monitor (4). Apertures (5) and (6) between the oscillator (14) and amplifier (15) are inserted to reduce the ASE (amplified spontaneous emission) (see also U.S. patent application Ser. Nos. 09/842,281 and 09/418, 052). A polarization rotator (not shown) can be used in the case the polarization have to be changed and would be inserted before the amplifier (15). A set of lenses (12) are between the oscillator (14) and the amplifier (15) to achieve a desired laser beam which will be coupled into the amplifier. An attenuator (7), which may provide variable attenuation, for reducing the energy of the beam generated by the oscillator if necessary. The variable attenuator (7) may be a rotatable beam splitter arrangement including one or two beam splitters, wherein if two beam splitters are used, they may be oppositely oriented for compensating beam direction offset caused by traversal of the beam splitters by the beam (see U.S. patent application Ser. No. 09/774,238, which are assigned to the same assignee as the present application and are hereby incorporated by reference). Accordingly, a laser oscillator (14) may be followed by an attenuator (7), which may provide variable attenuation, which is then followed by an amplifier (15). The beam generated by the oscillator (14) then has its energy reduced as it traverses the attenuator (7), and then the beam has its energy increased as it traverses the amplifier (15). An advantageously selected beam energy is then input to the amplifier which exhibits enhanced performance at or around the selected energy. In addition, the oscillator (14) may be initially configured to output a greater energy than is desired to input to the amplifier, which energy decreases as the gas mixture and/or optics and/or laser tube ages.

The amplifier (15) amplifies the beam which is delivered by the oscillator (14). Oscillator (14) and amplifier (15) have to be synchronized by synchronizer unit (11). The synchronization should be in the range of __t=10 . . . 25 ns with an accuracy of ±3 ns.

The amplifier (15) is followed by a blocking aperture (9) and an amplifier energy monitor (10) to control the output energy of the laser system. The lens system (13) is necessary to provide a desired laser beam to the application process.

A preferred method of operating a molecular fluorine laser system including an oscillator laser with a discharge chamber filled with a gas mixture and having a plurality of electrodes therein connected toga pulsed discharge circuit, and including a laser resonator for generating pulsed oscillator beam, an attenuator and a power amplifier may include a pulsed discharge circuit to apply electrical pulses to the electrodes of the laser system to output laser pulses having a wavelength around 157 nm and attenuating an energy of said output laser pulses to a first predetermined energy. Further amplifying the energy of the output laser pulses to a second predetermined energy for industrial lithographic processing. The method may further include narrowing a bandwidth of the oscillator laser beam to less than a characteristic bandwidth. The bandwidth may be preferably narrowed to less than 0.6 pm.

A preferred method of operating a molecular fluorine laser system including an oscillator laser including a discharge chamber filled with a gas mixture including an additive species tending to attenuate an energy of emission of the oscillator laser, and the discharge chamber of the oscillator laser having a plurality of electrodes therein connected to a pulsed discharge circuit, and including a laser resonator for generating a pulsed oscillator beam, and a power amplifier may also include a pulsed discharge circuit to apply electrical pulses to the electrodes of the laser system to generate the oscillator laser beam having a wavelength around 157 nm, and wherein an energy of emission of said oscillator laser beam is attenuated, due to the presence of said additive species, to a first predetermined energy and amplifying the energy of the output laser pulses to a second predetermined energy for industrial lithographic processing. The method may include narrowing a bandwidth of the oscillator laser beam to less than a characteristic bandwidth. The bandwidth may be preferably narrowed to less than 0.6 pm.

In a second aspect of the invention, a molecular fluorine laser is provided including a molecular fluorine laser oscillator and an amplifier, wherein the oscillator includes a discharge chamber filled with a gas mixture including molecular fluorine and a buffer gas and not including a laser active rare gas. A plurality of electrodes within the discharge chamber and defining a discharge region therebetween connected to a pulsed discharge circuit for applying discharge pulses to the electrodes for energizing the gas mixture. A resonator including the discharge chamber for generating an oscillator laser beam at a wavelength around 157 nm and a bandwidth of less than 0.6 pm and a power amplifier for increasing the energy of the attenuated oscillator laser beam to a second predetermined energy for lithographic processing, wherein the oscillator is configured to generate output laser pulses at a predetermined energy to be amplified by the amplifier in a system which exhibits a selected and preferably optimum or near optimum performance.

The oscillator may output pulses of energy around 0.1 mJ, wherein the amplifier would amplify the pulses by around a factor of 100 such that the system produces output pulses around 10 mJ, which is particularly preferred for industrial lithographic processing.

The oscillator may output pulses of energy around 0.5 mJ, wherein the amplifier would amplify the pulses by around a factor of 20 such that the system produces output pulses around 10 mJ, which is particularly preferred for industrial lithographic processing.

The oscillator may output pulses of energy around 0.33 mJ, wherein the amplifier would amplify the pulses by around a factor of 30 such that the system produces output pulses around 10 mJ, which is particularly preferred for industrial lithographic processing.

The oscillator may output pulses of energy around 1.0 mJ, wherein the amplifier would amplify the pulses by around a factor of 10 such that the system produces output pulses around 10 mJ, which is particularly preferred for industrial lithographic processing.

The oscillator may output pulses of energy around 0.67 mJ, wherein the amplifier would amplify the pulses by around a factor of 15 such that the system produces output pulses around 10 mJ, which is particularly preferred for industrial lithographic processing.

The system may include an attenuator, which may be a variable attenuator such as described above with reference to the first aspect of the invention. When the attenuator is disposed between the oscillator and the amplifier, the output energies could be increased from those described above, while the attenuator would decrease the pulse energies to those described above. The attenuator may be disposed after the amplifier so that the amplified pulse may be increased from the desired laser system output energies, while the attenuator would be used to reduce those energies to the desired energies, e.g., around 10 mJ for industrial lithographic processing.

The resonator of the laser system may further include a line-narrowing module for reducing the bandwidth of the oscillator laser beam to less than a characteristic bandwidth.

In a third aspect of the invention, the total pressure of the gas mixture of a molecular fluorine laser system, such as that described in more detail above and below herein, is reduced such that the spectral purity of the output beam is improved, or such that 95% of the energy of the output beam is contained within a smaller range of wavelengths around a maximum (see also U.S. patent application Ser. No. 09/883, 128, which is assigned to the same assignee as the present application and is hereby incorporated by reference). The total gas mixture pressure may be less than 2500 mbar, or 2000 mbar, or 1500 mbar, or even less than 1000 mbar. The partial pressure of the molecular fluorine within the gas mixture may increase as the total pressure is reduced so that the amount of molecular fluorine in the gas mixture is at an optimal value notwithstanding the value of the total pressure, although the absolute amount of molecular fluorine may be varied with the total pressure, e.g., as the optimum total amount of molecular fluorine varies with total gas mixture pressure.

In a fourth aspect of the invention, a molecular fluorine laser system is provided such as that described above or below herein, optionally including an amplifier and/or an attenuator, including a gas control unit for controlling the gas mixture within the discharge tube of the laser. It is possible to control the laser output by varying the high voltage applied to the electrodes. The high voltage can be set different for the oscillator or the amplifier. So a demanded gain of the system can be reached. The gas mixture lifetime between new gas fills is advantageously greater than 100 million pulses, and may be greater than 500–600 million pulses. That is, the gas replenishment routine includes performing successive new gas fills at an interval of more than 100 million pulses, or more than 500–600 million pulses, while the laser system exhibits high performance during the interval. Such high performance may include a power drift of 10% or less, and may include an energy dose stability of less than 0.5% and preferably around 0.2% or less during the interval. The gas replenishment procedures performed during the interval may include micro-halogen injections, micro-halogen injections, mini-partial gas replacements, partial new fills, etc. as described in more detail below in the "GAS REPLENISHMENT" section, and in the references incorporated by reference therein.

In a fifth aspect of the invention, a molecular fluorine laser system is provided which characteristically emits multiple closely-spaced lines around 157 nm. Among those lines are a main line around 157.631 nm, a secondary line around 157.524 nm and at least one additional line which is closer to the main line than the secondary line, i.e., less than 100 pm from the main line. The at least one additional line may include a third line around 157.597 nm (which is about 34 pm from the main line) and/or a fourth line around 157.530 nm. One or more line selection optical components are included in the resonator of the molecular fluorine laser system for substantially suppressing the secondary line and the at least one additional line, and particularly the third line around 157.597 nm, while allowing the main line to be output coupled for use at an application process.

An interferometric element may be used such as an etalon or an interferometric device having non-parallel reflecting surfaces, such as that described at U.S. patent applications Ser. Nos. 09/715,803 and 60/280,398, which are assigned to the same assignee as the present application and are hereby incorporated by reference. The interferometric element may be a resonator reflector such as for outcoupling or highly reflectively reflecting the beam, or the interferometric element may be disposed between the resonator reflectors of the resonator. A beam expander may be disposed in front of the interferometric device. The interferometric device would be configured to have an interference maximum approximately centered at the main line and an interference minimum approximately at the third line, i.e., the interference maximum and minimum are spaced about 34 pm apart.

The same interferometric element may have a second minimum around the secondary line, which is around 106 pm from the main line. The interferometric device is thus configured such that the interference minima are spaced apart by about 70 pm. The first interference trough may be expanded to suppress both of these line and perhaps others. Alternatively, a second optical element may be used to suppress the secondary line. Others lines may be suppressed with the line selection optics such as the fourth line, and/or a fifth line at 157.402 nm and/or a sixth line at 157.735 nm. One or more dispersive elements may be used such as prism(s) and/or a grating, and these may be used in combination with one or more apertures for blocking lines dispersed outside of the acceptance angle of the resonator, which may be reduced due to the presence of the one or more apertures. Other components that may be used includes grism(s), and the grism(s) and/or grating may be reflective or transmissive, and other optics are described below in the "LINE-NARROWING" section and in the reference incorporated by reference herein.

In a sixth aspect of the invention, a molecular fluorine laser system may include an extra-cavity spectral filter. The spectral filter may be used to improve the spectral purity of the beam, which may be a natural line that is not otherwise already line-narrowed within the resonator. The spectral filter may also be used to select the main line and tend to suppress one or more of the other lines either alone or in combination with line-selection optics such as those already described herein above and below. If an amplifier is used, the spectral filter is preferably disposed between the oscillator and the amplifier. The natural linewidth and/or spectral may be already reduced by controlling the total pressure of the gas mixture in the oscillator at a low pressure, such as below 2500 mbar, below 2000 mbar, below 1500 mbar or below 1000 mbar, such as has been described above with regard to the third aspect of the invention, and the spectral purity is then further improved by including the extra-cavity spectral filter in the $F_2$ laser system.

GENERAL DESCRIPTION OF OVERALL LASER SYSTEM

Figure 2:
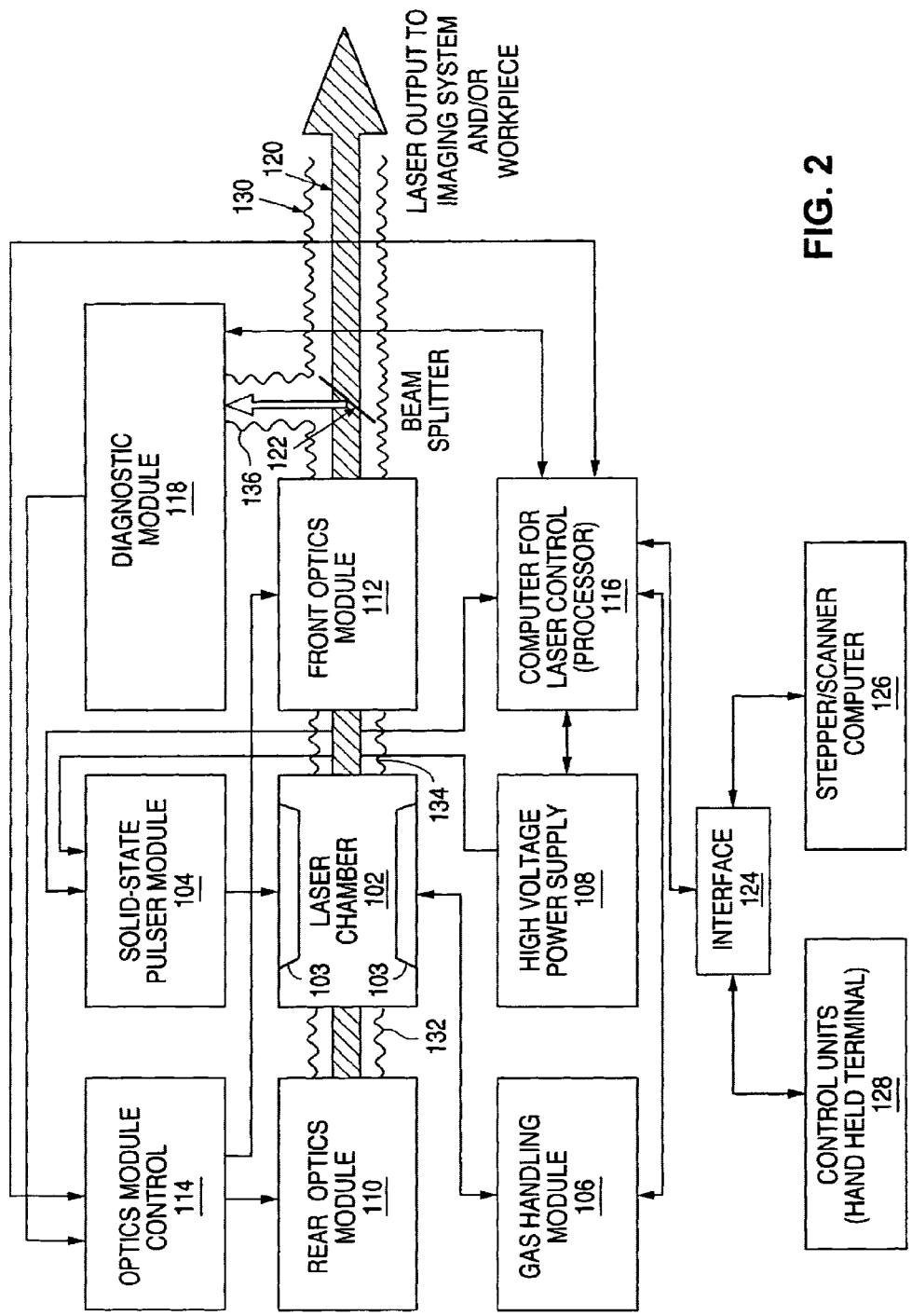
FIG. 2 is a block diagram of a laser system according to the present invention.

FIG. 2 schematically illustrates an overall molecular fluorine laser system according to a preferred embodiment. Referring to FIG. 2, an excimer or molecular fluorine laser system is schematically shown according to a preferred embodiment (the ideas set forth herein may be applied also to excimer lasers such as KrF or ArF excimer lasers). The preferred gas discharge laser system is a VUV laser system, such as a molecular fluorine ($F_2$) laser system, for use with a vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 2 to meet the requirements of that application. For this purpose, alternative DUV or VUV laser system and component configurations are described at U.S. patent applications Ser. Nos. 09/317,695, 09/130,277, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, 60/202,564, 60/204,095, 09/741,465, 09/574,921, 09/734,459, 09/741,465, 09/686,483, 09/715,803, and 09/780,124, and U.S. Pat. Nos. 6,005,880, 6,061,382, 6,020,723, 5,946,337, 6,014,206, 6,157,662, 6,154,470, 6,160,831, 6,160,832, 5,559,816, 4,611,270, 5,761,236, 6,212,214, 6,154,470, and 6,157,662, each of which is assigned to the same assignee as the present application and is hereby incorporated by reference.

The system shown in FIG. 2 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, rare and buffer gases, and preferably a gas additive, may be injected or filled into the laser chamber, preferably in premixed forms (see U.S. patent application Ser. No. 09/513,025, which is assigned to the same assignee as the present application, and U.S. Pat. No. 4,977,573, which are each hereby incorporated by reference) for ArF, XeCl and KrF excimer lasers, and halogen and buffer gases, and any gas additive, for the $F_2$ laser. For the high power XeCl laser, the gas handling module may or may not be present in the overall system. The solid-state pulser module 104 is powered by a high voltage power supply 108. A thyratron pulser module may alternatively be used. The laser chamber 102 is surrounded by optics module 110 and optics module 112, forming a resonator. The optics module may include only a highly reflective resonator reflector in the rear optics module 110 and a partially reflecting output coupling mirror in the front optics module 112, such as is preferred for the high power XeCl laser. The optics modules 110 and 112 may be controlled by an optics control module 114, or may be alternatively directly controlled by a computer or processor 116, particular when line-narrowing optics are included in one or both of the optics modules 110, 112, such as is preferred when KrF, ArF or $F_2$ lasers are used for optical lithography.

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion of the beam toward the module 118, such as preferably a beam splitter module 122. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

LASER CHAMBER

The laser chamber 102 contains a laser gas mixture and includes one or more preionization electrodes (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent application Ser. No. 09/692,265 (particularly preferred for KrF, ArF, $F_2$ lasers), Ser. Nos. 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

SOLID STATE PULSER MODULE

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply may be described at U.S. patent applications Ser. Nos. 09/640,595, 60/198,058, 60/204,095, 09/432,348 and 09/390,146, and 60/204,095, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

LASER RESONATOR

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. In accord with a preferred embodiment herein, optics for selecting one of multiple lines around 157 nm may be used, e.g., one or more dispersive prisms, interferometric devices or birefringent plates or blocks, wherein additional line-narrowing optics for narrowing the selected line may be included or left out. The total gas mixture pressure may be preferably lower than conventional systems, e.g., lower than 3 bar, for producing the selected line at a narrow bandwidth such as 0.5 pm or less without using additional line-narrowing optics.

Either no optics or merely a simple, not very lossy optical configuration for line-selection may be all that is included. That is, the preferred embodiment of may not have additional line-narrowing optics in the laser resonator, or includes only line-selection optics for selecting the main line at $\lambda_1 \approx 157.63094$ nm and suppressing any other lines around 157 nm that may be naturally emitted by the $F_2$ laser. Therefore, in one embodiment, the optics module 110 has only a highly reflective resonator mirror, and the optics module 112 has only a partially reflective resonator reflector. In another embodiment, suppression of the other lines (i.e., other than $\lambda_1$) around 157 nm is performed, e.g., by an outcoupler having a partially reflective inner surface and being made of a block of birefringent material or a VUV transparent block with a coating, either of which has a transmission spectrum which is periodic due to interference and/or birefringence, and has a maximum at $\lambda_1$ and a minimum at a secondary line. In another embodiment, simple optics such as a dispersive prism or prisms may be used for line-selection only, and not for narrowing of the main line at $\lambda_1$. Other line selection embodiments are set forth at U.S. patent applications Ser. Nos. 09/317,695, 09/657,396, and 09/599,130, each of which is assigned to the same assignee as the present application and is hereby incorporated by reference. The gas mixture pressure may be low enough to enable a narrow bandwidth, e.g., below 0.5 pm, even without further narrowing of the main line at $\lambda_1$ using additional optics, although such additional optics may be used, particularly in embodiments wherein an amplifier is used to increase the energy of the line-narrowed laser beam.

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110, 112, or reconfiguration procedures (see the '353, '695, '277, '554, and '527 applications mentioned above).

DIAGNOSTIC MODULE

After a portion of the output beam 120 passes the outcoupler of the optics module 112, that output portion preferably impinges upon a beam splitter module 122 which includes optics for deflecting a portion of the beam to the diagnostic module 118, or otherwise allowing a small portion of the outcoupled beam to reach the diagnostic module 118, while a main beam portion 120 is allowed to continue as the output beam 120 of the laser system (see U.S. patent applications Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 122 to control the intensity, spectral distribution and/or other parameters of the radiation impinging upon the detector (see U.S. patent applications Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer (see U.S. patent applications Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831 and 5,978,394, all of the above wavelength and/or bandwidth detection and monitoring components being hereby incorporated by reference. In accord with a preferred embodiment herein, the bandwidth is monitored and controlled in a feedback loop including the processor 116 and gas handling module 106. The total pressure of the gas mixture in the laser tube 102 is controlled to a particular value for producing an output beam at a particular bandwidth.

Other components of the diagnostic module may include a pulse shape detector or ASE detector, such as are described at U.S. patent applications Ser. Nos. 09/484,818 and 09/418,052, respectively, each of which is assigned to the same assignee as the present application and is hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

BEAM PATH ENCLOSURES

Particularly for the molecular fluorine laser system, and for the ArF laser system, an enclosure 130 preferably seals the beam path of the beam 120 such as to keep the beam path free of photoabsorbing species. Smaller enclosures 132 and 134 preferably seal the beam path between the chamber 102 and the optics modules 110 and 112, respectively, and a further enclosure 136 is disposed between the beam splitter 122 and the diagnostic module 118. Preferred enclosures are described in detail in U.S. patent applications Ser. Nos. 091598,552, 09/594,892 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference. The enclosure may be evacuated or purged with an inert gas. The optics module themselves are also maintained free of photoabsorbing species preferably by evacuating them and alternatively by filling them with an inert gas that may be preferably flowed or alternatively stagnant.

PROCESSOR CONTROL

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 2, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or an spectral filter external to the resonator is used for narrowing the linewidth of the output beam.

GAS MIXTURE

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162 and 4,977,573 and U.S. patent applications Ser. Nos. 09/513,025, 09/447,882, 09/418,052, and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the F2-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Although the preferred embodiments herein are particularly drawn to use with a $F_2$ laser, some gas replenishment actions are described for gas mixture compositions of other systems such as ArF, KrF, and XeCl excimer lasers, wherein the ideas set forth herein may also be advantageously incorporated into those systems.

Also, the gas composition for the $F_2$ laser in the above configurations uses either helium, neon, or a mixture of helium and neon as a buffer gas. The concentration of fluorine in the buffer gas preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and /or oxygen, and/or krypton and/or other gases (see the '025 application) may be used for increasing the energy stability, burst control, and/or output energy of the laser beam. The concentration of xenon, argon, oxygen, or krypton in the mixture may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

Preferably, a mixture of 5% $F_2$ in Ne with He as a buffer gas is used, although more or less He or Ne may be used. The total gas pressure may be advantageously adjustable between 1500 and 4000 mbar for adjusting the bandwidth and/or spectral purity of the laser, and also optional for adjusting the wavelength. The partial pressure of the buffer gas is preferably adjusted to adjust the total pressure, such that the amount of molecular fluorine in the laser tube is not varied from an optimal, pre-selected amount. The bandwidth and spectral purity are shown to advantageously decrease with decreased He and/or Ne buffer gas in the gas mixture. Thus, the partial pressure of the He and/or Ne in the laser tube is adjustable to adjust the bandwidth of the laser emission.

GAS MIXTURE REPLENISHMENT

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214 and 5,396,514 and U.S. patent applications Ser. Nos. 09/447,882, 09/418,052, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1%$F_2$:99%Ne or other buffer gas such as He, and another gas line for injecting a premix B including 1% rare gas:99% buffer gas, for a rare gas-halide excimer laser, wherein for a $F_2$ laser premix B is not used. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

The halogen concentration in the gas mixture is maintained constant during laser operation by gas replenishment actions by replenishing the amount of halogen in the laser tube for the preferred molecular fluorine laser herein, such that these gases are maintained in a same predetermined ratio as are in the laser tube 102 following a new fill procedure. In addition, gas injection actions such as μHIs as understood from the '882 application, mentioned above, may be advantageously modified into micro gas replacement procedures, such that the increase in energy of the output laser beam may be compensated by reducing the total pressure. In contrast, or alternatively, conventional laser systems would reduce the input driving voltage so that the energy of the output beam is at the predetermined desired energy. In this way, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

LINE NARROWING

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used for selecting the primary line $\lambda_1$ only, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 60/212,301, which is assigned to the same assignee and is hereby incorporated by reference). Exemplary line-narrowing optics contained in the optics module 110 include a beam expander, an optional interferometric device such as an etalon or otherwise as described in the Ser. No. 09/715,803 application, incorporated by reference above, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism or alternatively no line-narrowing or line-selection may be performed in the rear optics module 110. In the case of using an all-reflective imaging system, the laser may be configured for semi-narrow band operation such as having an output beam linewidth in excess of 0.6 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

One or more apertures may be included in the resonator for blocking stray light and matching the divergence of the resonator (see the '277 application). As mentioned above, the front optics module may include line-narrowing optics (see the Ser. Nos. 09/715,803, 09/738,849 and 09/718,809 applications, each being assigned to the same assignee as the present application and hereby incorporated by reference), including or in addition to the outcoupler element.

Depending on the type and extent of line-narrowing and/or selection and tuning that is desired, and the particular laser that the line-narrowing optics are to be installed into, there are many alternative optical configurations that may be used other than those specifically described below. For this purpose, those shown in U.S. Pat. Nos. 4,399,540, 4,905, 243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

As discussed, there may be no line-narrowing optics in the resonator, in some embodiments, that are subject to degradation or produce losses, wherein alternatively, only optics to select a single line (i.e., $\lambda_1$) may be used. However, line-narrowing optics may be used for further line-narrowing in combination with the line-narrowing and/or bandwidth adjustment that is performed by adjusting/reducing the total pressure in the laser chamber. For example, a natural bandwidth may be adjusted to 0.5 pm by reducing the partial pressure of the buffer gas to 1000–1500 mbar. The, bandwidth could than be reduced to 0.2 pm or below using line-narrowing optics either in the resonator or external to the resonator. Thus, a general description of the line-narrowing optics that may be used are provided here. Exemplary line-narrowing optics are contained in the optics module 10, or the rear optics module, include a beam expander, an optional etalon and a diffraction grating, which produces a relatively high degree of dispersion, for a narrow band laser such as is used with a refractive or catadioptric optical lithography imaging system. The line-narrowing package may include a beam expander and one or more etalons followed by an HR mirror as a resonator reflector.

OPTICAL MATERIALS

In all of the above and below embodiments, the material used for any dispersive prisms, the prisms of any beam expanders, etalons, laser windows and the outcoupler is preferably one that is highly transparent at wavelengths below 200 nm, such as at the 157 nm output emission wavlength of the molecular fluorine laser. The materials are also capable of withstanding long-term exposure to ultraviolet light with minimal degradation effects. Examples of such materials are $CaF_2$, $MgF_2$, $BaF_2$, LiF and $SrF_2$, and in some cases fluorine-doped quartz may be used. Also, in all of the embodiments, many optical surfaces, particularly those of the prisms, may or may not have an anti-reflective coating on one or more optical surfaces, in order to minimize reflection losses and prolong their lifetime.

POWER AMPLIFIER

A line-narrowed oscillator, e.g., a set forth above, may be followed by a power amplifier for increasing the power of the beam output by the oscillator. Preferred features of the oscillator-amplifier set-up are set forth at U.S. patent applications Ser. Nos. 09/599,130 and 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. The molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts). An attenuator, which may be a variable attenuator, may be included after the oscillator, preferably before and alternatively after the amplifier.

In one embodiment, the molecular fluorine laser oscillator may have an advantageous total gas pressure, or gas composition, that produces a very narrow band emission at $\lambda_1$ without optics that are typically used for achieving such a very narrow bandwidth, e.g., less than 0.5 pm. A 157 nm beam is output from the output coupler and may be incident at an amplifier to increase the power of the beam, or the power of the beam may be sufficient such that an amplifier is not used. Thus, a very narrow bandwidth beam (e.g., less than 0.5 pm) is achieved with high power (at least several Watts to more than 10 Watts) and may be without sophisticated very narrow bandwidth line-narrowing optics.

While exemplary drawings and specific embodiments of the present invention have been described and illustrated, it is to be understood that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

INCORPORATION BY REFERENCE

What follows is a cite list of references which are, in addition to those references cited above in the background section and the background and invention summary section themselves, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. patent applications Ser. Nos. 09/453,670, 09/447,882, 09/317,695, 09/512,417, 09/599,130, 09/598,552, 09/695,246, 09/712,877, 09/574,921, 09/738,849, 09/718,809, 09/733,874 and 09/780,124, 60/267,567, 09/883,128, 60/212,257, 09/791,431 and 09/771,013, which are assigned to the same assignee as the present application;

U.S. Pat. Nos. 6,154,470, 6,157,662, 6,219,368, 5,150,370, 5,596,596, 5,642,374, 5,559,816, and 5,852,627, 6,005,880, and 5,901,163; and all patent, patent application and non-patent references mentioned in the background or specification of this application; and K. Vogler, "Advanced $F_2$-laser for Microlithography", Proceedings of the SPIE 25$^{th}$ Annual International Symposium on Microlithography, Santa Clara, Feb. 28–Mar. 3, 2000, p. 1515; and European patent no. EP 0 472 727 B1.

What is claimed is:

1. A molecular fluorine laser oscillator includes:

(a) a discharge chamber filled with a gas mixture including molecular fluorine and a buffer gas and not including a laser active rare gas;

(b) a plurality of electrodes within the discharge chamber and defining a discharge region therebetween connected to a pulsed discharge circuit for applying discharge pulses to the electrodes for energizing the gas mixture;

(c) a resonator including the discharge chamber for generating an oscillator laser beam at a wavelength around 157 nm and a bandwidth of less than 0.6 pm;

(d) an attenuator for reducing an energy of the oscillator laser beam to a first predetermined energy;

(e) a power amplifier for increasing the energy of the attenuated oscillator laser beam to a second predetermined energy for lithographic processing;

(f) a line-narrowing unit for line-narrowing the bandwidth of the oscillator laser beam;

(g) a low intensity suppressor module to suppress the weaker lines of the oscillator laser beam; and (h) a synchronization unit to synchronize the oscillator and amplifier.

2. A molecular fluorine laser oscillator includes:

(a) a discharge chamber filled with a gas mixture including molecular fluorine and a buffer gas and not including a laser active rare gas;

(b) a plurality of electrodes within the discharge chamber and defining a discharge region therebetween connected to a pulsed discharge circuit for applying discharge pulses to the electrodes for energizing the gas mixture;

(c) a resonator including the discharge chamber for generating an oscillator laser beam at a wavelength around 157 nm and a bandwidth of less than 0.6 pm;

(d) a power amplifier for increasing the energy of the oscillator laser beam to a predetermined energy for lithographic processing;

(e) a line-narrowing unit for line-narrowing the bandwidth of the oscillator laser beam;

(f) a low intensity suppressor module to suppress the weaker lines of the oscillator laser beam; and (g) a synchronization unit to synchronize the oscillator and amplifier.

3. An excimer or molecular fluorine laser oscillator, including:

(a) a discharge chamber filled with a gas mixture including molecular fluorine and a buffer gas;

(b) a plurality of electrodes within the discharge chamber and defining a discharge region therebetween connected to a pulsed discharge circuit for applying discharge pulses to the electrodes for energizing the gas mixture;

(c) a resonator including the discharge chamber for generating an oscillator laser beam at a wavelength around 157 nm and a bandwidth of less than 0.6 pm;

(d) an additive species within the gas mixture which tends to attenuate an energy of the oscillator laser beam;

(e) a power amplifier for increasing the energy of the attenuated oscillator laser beam to a predetermined energy for lithographic processing;

(f) a line-narrowing unit for line-narrowing the bandwidth of the oscillator laser beam;

(g) a low intensity suppressor module to suppress the weaker lines of the oscillator laser beam; and (h) a synchronization unit to synchronize the oscillator and amplifier.

* * * * *